(12) United States Patent
Kim

(10) Patent No.: US 8,693,997 B2
(45) Date of Patent: *Apr. 8, 2014

(54) VISUAL ARS SERVICE SYSTEM AND METHOD ENABLED BY MOBILE TERMINAL'S CALL CONTROL FUNCTION

(71) Applicant: Call Gate Co., Ltd., Seoul (KR)

(72) Inventor: Yong-Jin Kim, Seoul (KR)

(73) Assignee: Call Gate Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,766

(22) Filed: Mar. 12, 2013

(65) Prior Publication Data

US 2013/0217368 A1    Aug. 22, 2013

Related U.S. Application Data

(63) Continuation of application No. 12/682,502, filed as application No. PCT/KR2008/005907 on Oct. 8, 2008, now Pat. No. 8,437,747.

(30) Foreign Application Priority Data

Oct. 12, 2007   (KR) .................. 10-2007-0102955

(51) Int. Cl.
*H04B 3/46* (2006.01)

(52) U.S. Cl.
USPC ........................... 455/418; 455/419; 455/420

(58) Field of Classification Search
USPC .............................................. 455/418–420
See application file for complete search history.

(56) References Cited

U.S. PATENT DOCUMENTS

| 5,881,134 | A | * | 3/1999 | Foster et al. ............... 379/88.01 |
| 7,136,478 | B1 | | 11/2006 | Brand |
| 7,685,252 | B1 | * | 3/2010 | Maes et al. .................... 709/217 |
| 7,934,148 | B2 | * | 4/2011 | Bobo, II ....................... 715/208 |
| 2003/0074198 | A1 | | 4/2003 | Sussman |
| 2006/0093100 | A1 | | 5/2006 | Carlson et al. |

FOREIGN PATENT DOCUMENTS

| EP | 1701527 | 9/2006 |
| JP | 09331389 | 12/1997 |
| JP | 11146080 | 5/1999 |

(Continued)

OTHER PUBLICATIONS

International Search Report—PCT/KR2008/005907 dated Apr. 28, 2009.

(Continued)

*Primary Examiner* — Patrick Edouard
*Assistant Examiner* — Julio Perez
(74) *Attorney, Agent, or Firm* — Cantor Colburn LLP

(57) ABSTRACT

Disclosed is a system and a method for providing a Visual ARS (VARS) service by using a call control function of a mobile communication terminal. In the system and the method, a user of a terminal can select an existing voice guidance service or an available visual guidance service when trying a call connection to a telephone number of an existing call center. When selecting a visual guidance service, an originator receives an ARS service on a screen of the terminal of the originator. Accordingly, the user can receive and use the VARS service according to the user's selection by using a mobile communication network, so that the user can handle a task requested on a screen of the terminal.

16 Claims, 9 Drawing Sheets

(56) References Cited

FOREIGN PATENT DOCUMENTS

| | | |
|---|---|---|
| JP | 2005109997 | 4/2005 |
| JP | 2005110027 | 4/2005 |
| KR | 10-2004-0018872 | 3/2004 |
| KR | 10-2004-0079638 | 9/2004 |
| KR | 10-2004-0085539 | 10/2004 |
| KR | 10-2006-0002410 | 1/2006 |
| WO | 9750236 | 12/1997 |

OTHER PUBLICATIONS

Korean Office Action—KR 10-2007-0102955 dated Jun. 25, 2009.
Japanese Office Action—Japanese Application No. 2010-528801 issued on Dec. 20, 2011, citing JP11-146080, JP09-331389, JP2005-109997, and JP2005-110027.
European Search Report—European Application No. 08836869 issued on May 24, 2012, citing US7136478, WO9750236, US2006093100 and EP1701527.

* cited by examiner

Fig. 3

| FIELD NAME | FIELD VALUE | |
|---|---|---|
| TELESERVICE ID (TID) | 63005 | 301 |
| APPLICATION ID | A0100J1011 | 302 |
| CALL CONTROL PARAMETER | BLK | 303 |
| CONTENT URL | CS011/CC00234 | 304 |

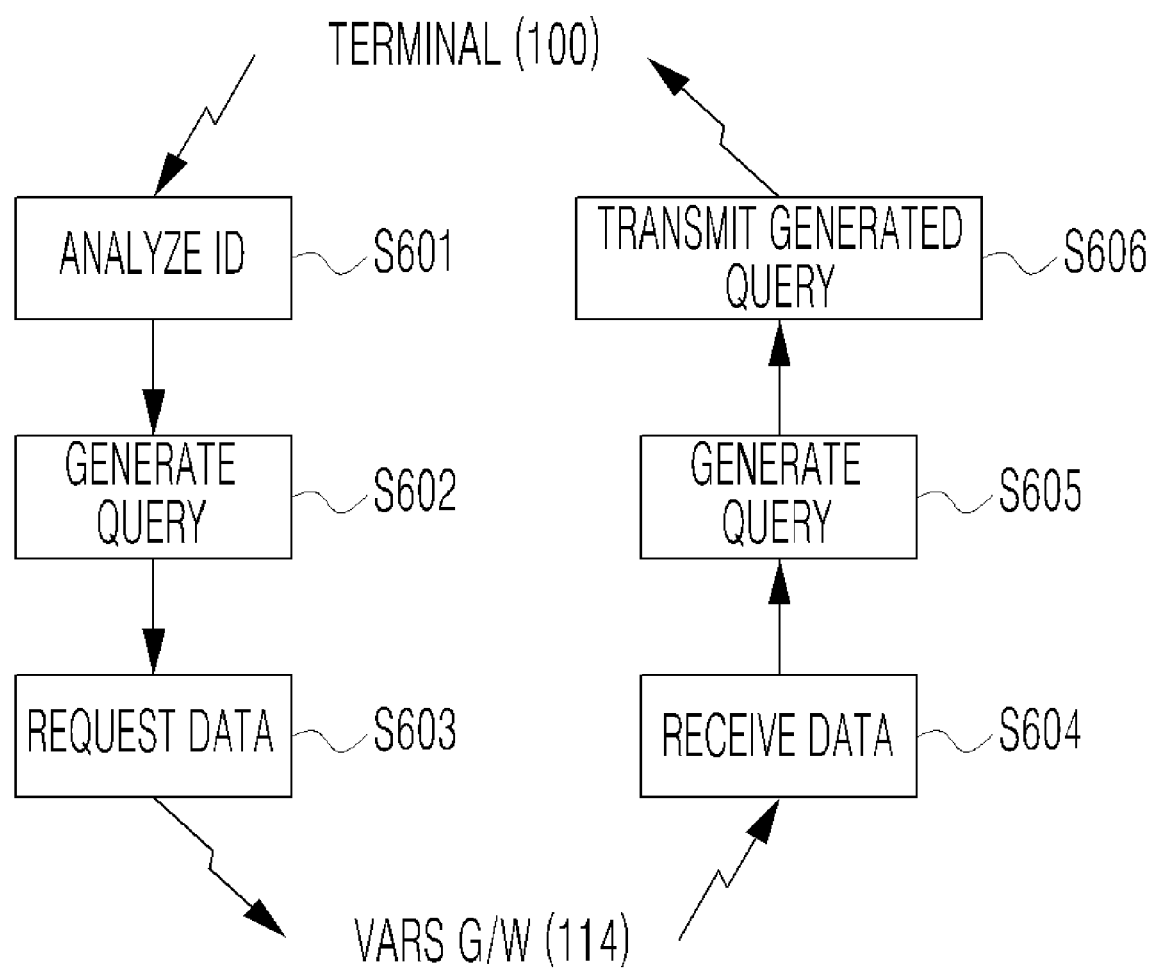

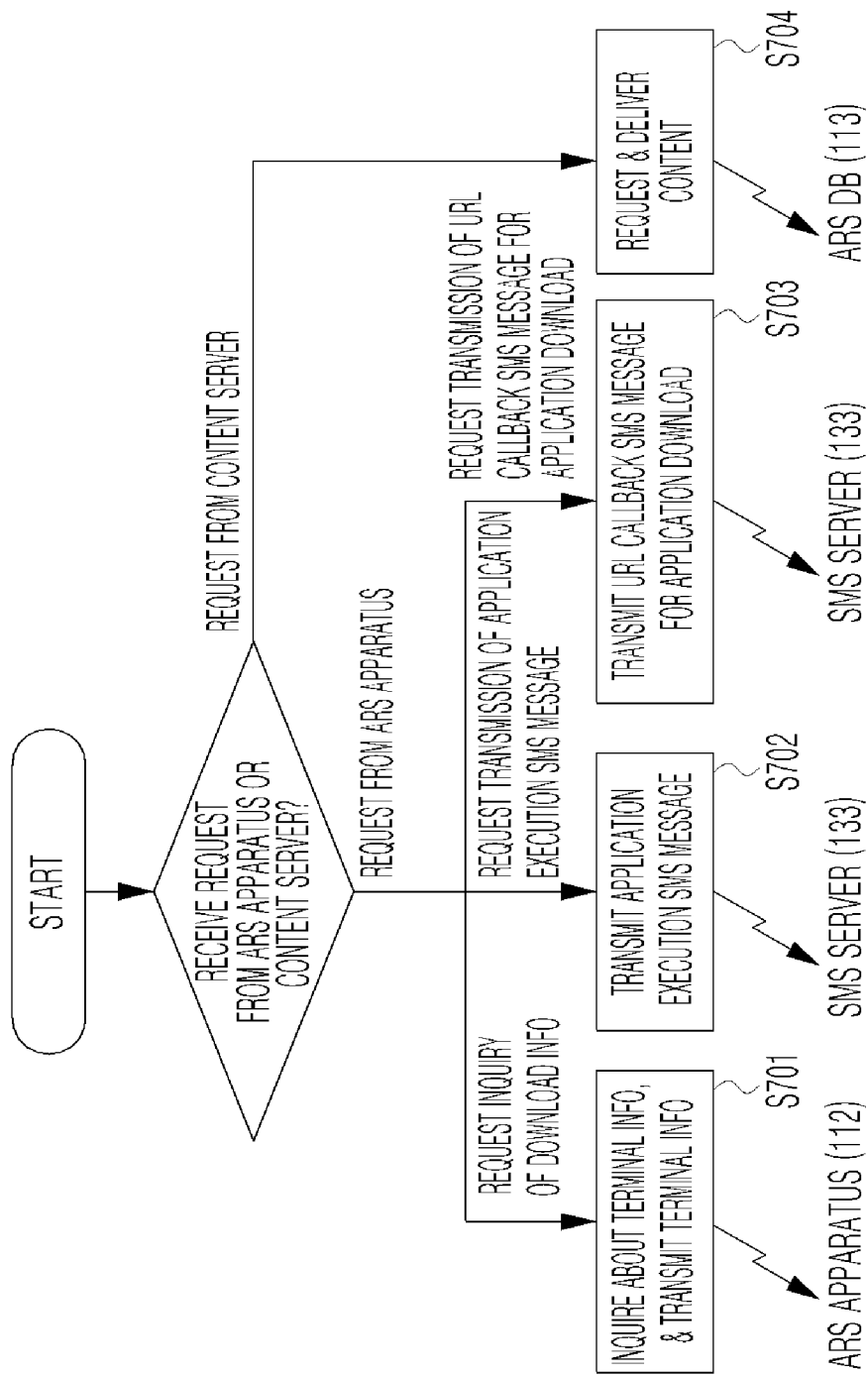

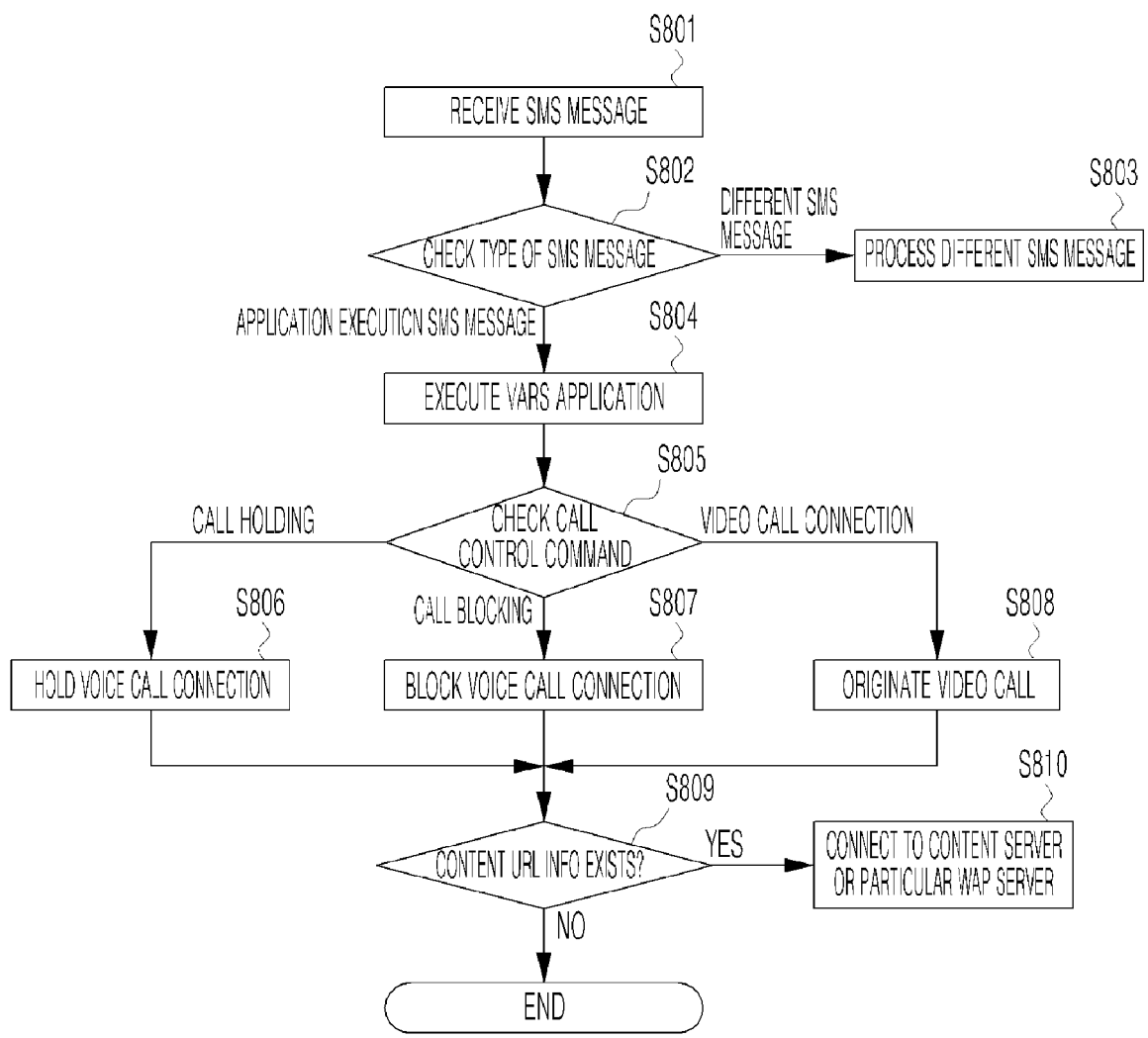

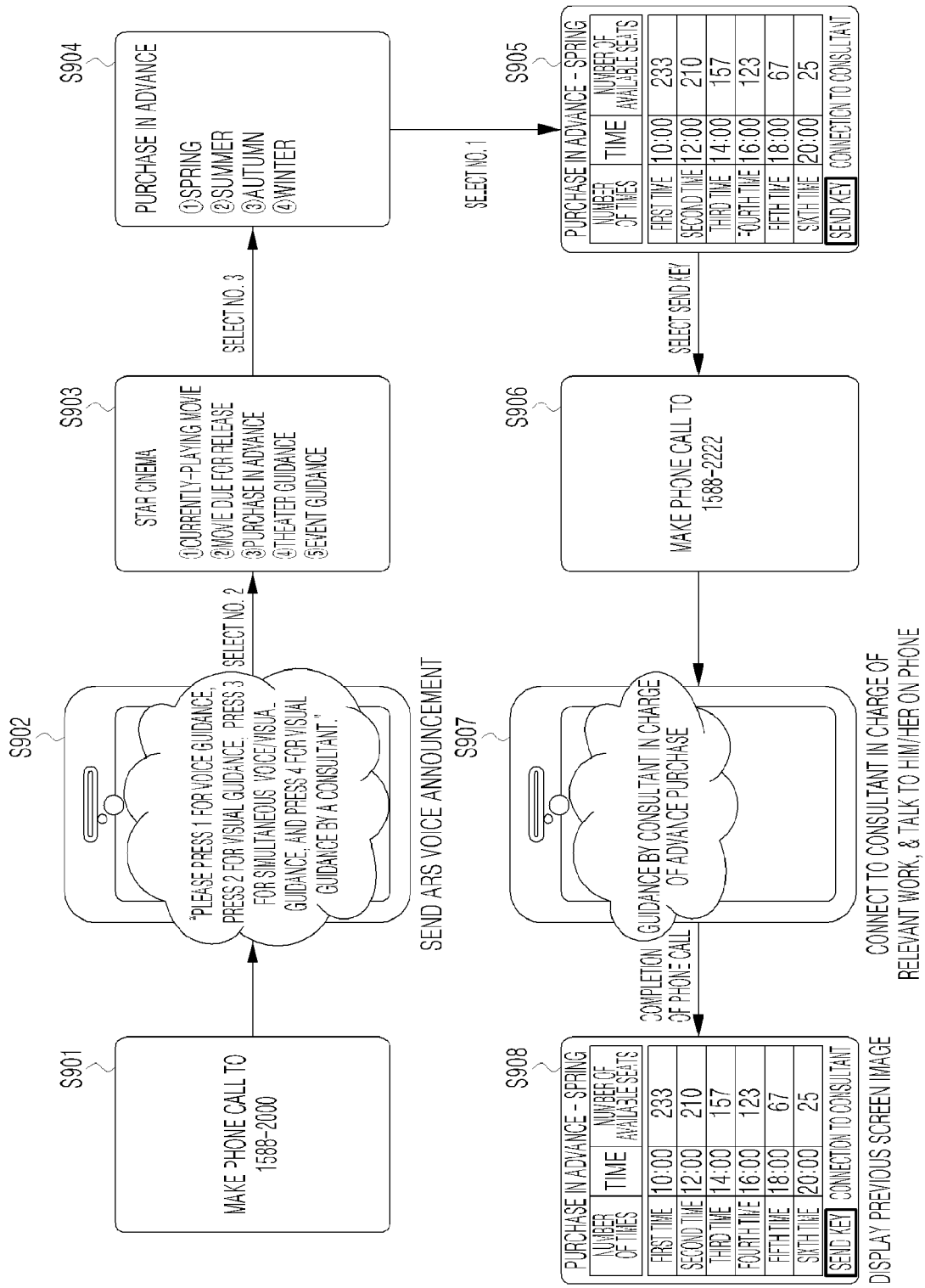

VISUAL ARS SERVICE SYSTEM AND METHOD ENABLED BY MOBILE TERMINAL'S CALL CONTROL FUNCTION This is a continuation application of U.S. patent application Ser. No. 12/682,502, filed on Apr. 9, 2010, which is a national entry of International Application No. PCT/KR2008/005907, filed on Oct. 8, 2008, which claims a priority to and the benefit of Korean Patent Application No. 10-2007-0102955, filed on Oct. 12, 2007, the contents of which in their entirety are herein incorporated by reference.

TECHNICAL FIELD

The present invention relates to a system and a method for providing an Automatic Response System (ARS) service by using a mobile communication network.

BACKGROUND ART

Generally, the term "Automatic Response System" (ARS) refers to a service which, by using a relevant voice included in various types of voice information stored in a storage device, informs a user of a search method in order to be able to search for necessary information when a user connects to an ARS server through a telephone, and provides the user with automatic responses to located necessary information when the user locates the necessary information. As a result, the ARS has been widely used in various fields, such as various types of customer centers, a retail payment system, etc.

SUMMARY OF THE INVENTION

However, despite the continuous development of a mobile communication terminal and a mobile communication network supporting the mobile communication terminal, an ARS service (i.e. an automatic response service) has provided a stereotyped voice-centered service until now. Accordingly, for example, the ARS service has the inconvenience that a user must wait while listening to voice guidance so that he/she may listen to the voice guidance and input numeral keys according to the voice guidance. Namely, the conventional ARS service using a voice announcement has, as problems, the inconvenience that a user cannot help listening to an unnecessary voice announcement, and the limitation and inaccuracy of information which can be provided by using voices.

Accordingly, in order to minimize the inconvenience of users and overcome the limitation and inaccuracy of voice information, the present invention proposes a scheme, which provides a VARS service which can be supported in a communication scheme of a user terminal, so that a user can use a Visual ARS (VARS) service according to the user's selection.

Accordingly, the present invention has been made to overcome the above-mentioned disadvantage of a limited voice ARS service using a voice announcement that a call center currently provides in a stereotyped manner regardless of a communication scheme supported by a terminal. Namely, according to the scheme proposed by the present invention, when a user tries a call connection to a telephone number of an existing call center, the user can select and use a desired one from various VARS guidance services supported by the terminal, as well as the existing voice guidance service.

In accordance with an aspect of the present invention, there is provided a system for providing an Automatic Response System (ARS) service, the system including: an ARS system for providing a voice announcement of an ARS service asking about a desired ARS service type when receiving a request for the ARS service from a terminal, and transmitting, to the relevant terminal, an application execution Short Message Service (SMS) message for executing a relevant application (i.e. a Visual ARS (VARS) application) built-in to the terminal when receiving a request for a VARS service from the terminal; a VARS system for providing the ARS system with terminal information of the terminal, and providing the terminal with screen images of both an ARS menu and a detailed content for each item of the ARS menu in response to the request for the VARS service by the terminal; and the terminal for executing the VARS application built-in to the terminal, controlling a call in progress by using a call control command included in the application execution SMS message, connecting to the VARS system by using content location information included in the application execution SMS message, and receiving and displaying the screen images of both the ARS menu and the detailed content for each item of the ARS menu within a relevant content, when receiving the application execution SMS message from the ARS system.

Preferably, the terminal information includes both a type of a communication scheme supported by the relevant terminal and whether the VARS application is downloaded to the relevant terminal.

Preferably, the VARS system receives and delivers information on the type of the communication scheme supported by the relevant terminal and information on whether the VARS application is downloaded to the relevant terminal, provided by a Home Location Register (HLR) of a mobile communication network. Also, the VARS system receives and delivers information on the type of the communication scheme supported by the relevant terminal and information on whether the VARS application is downloaded to the relevant terminal, provided by a separate terminal without interlocking with a Home Location Register (HLR) of a mobile communication network.

Preferably, the ARS system downloads the VARS application to the relevant terminal when the VARS application is not installed on the terminal which requests the ARS service.

More preferably, the ARS system performs a voice ARS service for the relevant terminal when the ARS system provides the voice announcement of the ARS service and then receives a request for voice guidance from the terminal.

Preferably, the SMS message for executing the VARS application includes: a Teleservice IDentifier (TID) indicating a type of an SMS message for executing an application within the terminal; an application ID indicating a type of an application to be executed; a call control parameter indicating a command for call control including call holding, call blocking, and video call transfer; and a content Uniform Resource Locator (content URL) indicating location information of a content configuring the screen image of the ARS menu.

Preferably, the request for the VARS service is a request for any of visual guidance, a request for simultaneous voice/visual guidance, and a request for visual guidance by a consultant.

Preferably, the call control parameter includes a call blocking command when the terminal sends the request for the visual guidance, the call control parameter includes a call holding command when the terminal sends the request for the simultaneous voice/visual guidance, and the call control parameter includes a video call transfer command when the terminal sends the request for the visual guidance by a consultant.

Preferably, a determination of the call control is not made by the terminal, but is performed by the ARS system by determining call processing details required to support a particular VARS service selected by a user.

Preferably, the ARS system provides the relevant terminal with a voice announcement recommending the VARS service only if the VARS application for performing the VARS service within the terminal is loaded into the terminal.

Preferably, the terminal includes: a VARS application for controlling a call by using the call control command included in the application execution SMS message, connecting to a relevant content server by using content URL information included in the application execution SMS message, and receiving and analyzing information provided by the content server to configure screen images of both an ARS menu and a detailed content for each item of the ARS menu; an SMS task management unit for analyzing a type of a received SMS message when receiving an SMS processing request, and executing the VARS application if the received SMS message corresponds to the application execution SMS message; and a call task management unit for controlling a screen related to a phone call, and first applying a User Interface (UI) of the VARS application to a screen of the terminal.

Preferably, the VARS system includes: a terminal information server for transmitting the terminal information of the terminal requesting the ARS service to the ARS system; and a content server for configuring screen images of both an ARS menu and a detailed content for each item of the ARS menu, and providing the configured screen images of both the ARS menu and the detailed content for each item of the ARS menu to the terminal connecting to the content server by using the URL information included in the application execution SMS message.

Preferably, the content server receives information requested by the terminal from an ARS DataBase (ARS DB) within the ARS system, and provides the received information to the terminal.

Preferably, the ARS system includes: a VARS GateWay (VARS G/W) for performing a gateway function between the VARS system and an SMS server; an ARS apparatus for receiving information on whether the VARS application is loaded into the terminal, providing the terminal with a voice announcement of an ARS service for selecting a voice ARS service or a supportable VARS service, and directing the VARS G/W to deliver the application execution SMS message; and an ARS DB for storing therein contents required to provide the VARS service.

Preferably, when receiving a request for the terminal information of the terminal from the ARS apparatus, the VARS G/W requests the VARS system to transmit the terminal information, receives the requested terminal information, and delivers the received terminal information to the ARS apparatus.

Preferably, when receiving a request for transmitting the application execution SMS message from the ARS apparatus, the VARS G/W generates an application execution SMS message including both a call control command and content URL information required to provide the VARS service, and requests the SMS server to transmit the generated application execution SMS message.

Preferably, when receiving a request for transmitting a URL callback SMS message for application download from the ARS apparatus, the VARS G/W generates the URL callback SMS message for the application download including location information of a particular application download server, to which an application is downloaded, and requests the SMS server to transmit the generated URL callback SMS message for the application download.

Also, the VARS G/W performs a request for a content and the delivery of the requested content between the content server and the ARS DB.

In accordance with another aspect of the present invention, there is provided a method for providing an Automatic Response System (ARS) service, the method including the steps of: 1) providing a voice announcement of the ARS service asking if a terminal is to receive a voice ARS service or a Visual ARS (VARS) service when receiving a request for the ARS service from a terminal, by an ARS system; 2) performing a voice guidance ARS service when receiving a request for the voice ARS service from the terminal, and transmitting, to the terminal, an application execution Short Message Service (SMS) message for executing a VARS application built-in to the terminal when receiving a request for the VARS service from the terminal, by the ARS system; and 3) executing the VARS application to display a screen image of an ARS menu when receiving the application execution SMS message from the ARS system, by the terminal.

Preferably, step 1) includes the sub-steps of: 1-1) receiving a call for requesting the ARS service from the terminal; 1-2) receiving terminal information of the terminal, and determining both whether the VARS application is loaded into the terminal and a type of a communication scheme supported by the terminal; and 1-3) providing a voice announcement of the ARS service asking if the terminal is to receive the voice ARS service or an available VARS service when it is determined in step 1-2) that the VARS application is loaded into the terminal.

Preferably, when the VARS application is not loaded into the terminal, a voice announcement is provided for asking if the terminal is to receive a URL callback SMS message for application download enabling the download of the VARS application, or is to use the voice ARS service.

Preferably, when the terminal sends a request for receiving the URL callback SMS message for the application download, the URL callback SMS message for the application download is transmitted to the terminal, thereby downloading the VARS application to the terminal.

Preferably, the voice announcement of the ARS service further includes a voice announcement recommending simultaneous voice/visual guidance and a voice announcement recommending visual guidance by a consultant when the type of the communication scheme supported by the terminal is above a third Generation (3G).

Preferably, step 3) includes the sub-steps of: 3-1) executing the relevant VARS application by using the TID and the application ID of the received application execution SMS message; 3-2) performing a call control procedure including call holding, call blocking, and video call transfer by using the call control parameter of the received application execution SMS message; and 3-3) receiving a screen image of an ARS menu within a relevant content based on the content URL information of the received application execution SMS message, and displaying the received screen image of the ARS menu.

The present invention has been made to overcome the disadvantage of a limited voice guidance-centered ARS service that a call center currently provides in a stereotyped manner regardless of the generation development of terminals and provide various VARS services with the development of mobile communication terminals. Hence, the present invention minimizes both the inconvenience of listening to an unnecessary voice announcement for the use of an ARS service and the limitation and inaccuracy of information which can be provided by using voices.

DESCRIPTION OF DRAWINGS

The foregoing and other objects, features and advantages of the present invention will become more apparent from the following detailed description when taken in conjunction with the accompanying drawings in which:

FIG. 3 is an explanatory view showing an internal structure of an application execution Short Message Service (SMS) message according to an embodiment of the present invention;

FIG. 6 is a flowchart showing an operation process of a content server according to an embodiment of the present invention;

FIG. 7 is an explanatory view showing each operation of a Visual Automatic Response System GateWay WARS G/W) according to an embodiment of the present invention;

FIG. 8 is a flowchart showing an operation process of the terminal according to an embodiment of the present invention; and FIG. 9 is an illustrative view showing an ARS service-providing User Interface (UI) according to an embodiment of the present invention.

DETAILED DESCRIPTION OF THE INVENTION

Figure 1:
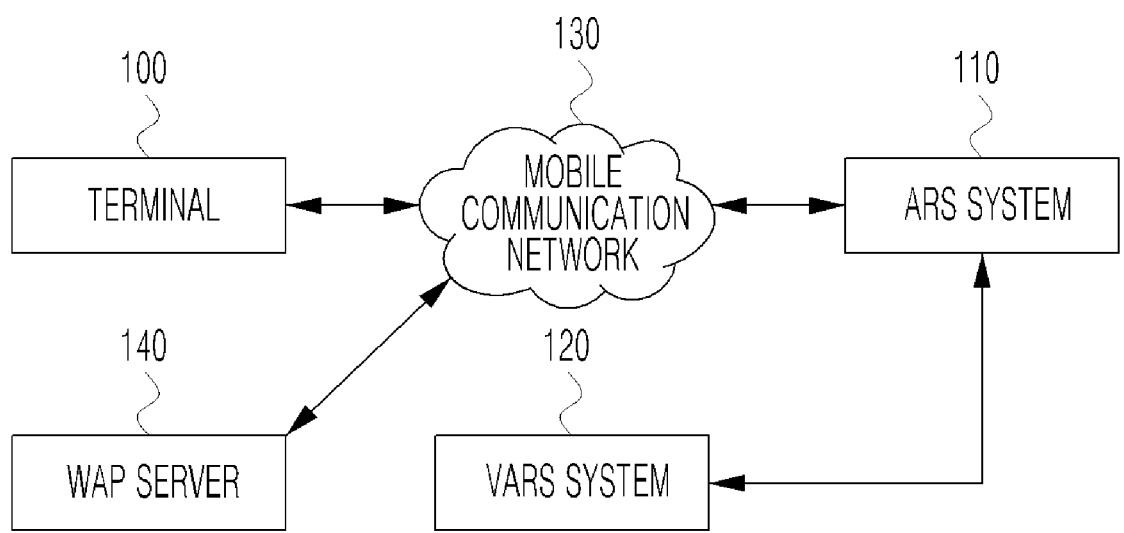
FIG. 1 is a block diagram illustrating a configuration of an ARS service-providing system according to an embodiment of the present invention.

Hereinafter, exemplary embodiments of the present invention will be described with reference to the accompanying drawings. Regarding the same configuration elements in the accompanying drawings, it should be noted that the same configuration elements will be designated by the same reference numerals all through the following description and drawings although they are shown in different drawings. Also, in the following description of the present invention, a detailed description of known functions and configurations incorporated herein will be omitted when it may make the subject matter of the present invention rather unclear.

FIG. 1 is a block diagram illustrating a configuration of an ARS service-providing system according to an embodiment of the present invention.

Referring to FIG. 1, a terminal 100 makes a normal call to an ARS system 110 via a mobile communication network 130. When a user receiving a voice announcement of an ARS service provided by the ARS system 110 selects not voice guidance but a particular VARS service (i.e. visual guidance, simultaneous voice/visual guidance, and visual guidance by a consultant), the ARS system 110 transmits an application execution SMS message for performing the particular VARS service. The application execution SMS message includes a command for executing a VARS application built-in to the terminal 100. Also, it includes a command for call processing, including holding, blocking of a current call and the transfer of a current call to a video call, and a content Uniform Resource Locator (content URL) (i.e. content location information).

Upon receiving the application execution SMS message transmitted by the ARS system 110, the terminal 100 executes the VARS application built-in to the terminal 100. Then, the VARS application executed as described above either holds, blocks, or transfers, to a video call, a call connection process in progress in response to a call-originating request of an originator by using a call processing command included in the application execution SMS message, thereby preparing for providing the particular VARS service selected by the user. Subsequently, the terminal 100 connects to a VARS system 120 or a particular Wireless Application Protocol (WAP) server 140 by using the content URL information included in the application execution SMS message, and displays screen images of both an ARS service menu and detailed content for each item of the ARS service menu, registered by a call center. The terminal 100 must be loaded with the VARS application for performing the functions as described above, but if not, must be able to be loaded with the VARS application through an SMS employing a URL call-back scheme.

Upon receiving a call from the terminal 100, the ARS system 110 configures a voice announcement recommending VARS services which can be provided based on information on whether the VARS application is downloaded to the terminal 100 and a type of a communication scheme supported by the terminal 100, both of which are provided by the VARS system 120, and provides the configured voice announcement to the terminal 100. For example, the ARS system 110 provides a voice announcement, "Please press 1 for voice guidance, press 2 for visual guidance, press 3 for simultaneous voice/visual guidance, and press 4 for visual guidance by a consultant." When the terminal 100 selects a service for the visual guidance or the simultaneous voice/visual guidance, the ARS system 110 transmits, to the terminal 100, an application execution SMS message including both a call processing direction command and content URL information, required to provide the visual ARS service. When the terminal 100 selects the visual guidance by a consultant, the ARS system 110 includes, in the application execution SMS message, a telephone number of a consultant capable of answering video telephony in addition to the information as described above, and transmits the application execution SMS message to the terminal 100.

When a user of the terminal 100 tries to connect to a consultant while using particular information through the visual ARS service, the ARS system 110 checks if consultants connected to the particular telephone number are available based on a call originated from a particular telephone number, and assigns the call to an available consultant. The ARS system 110 may connect directly to a mobile communication system, or connect to the mobile communication system via the mobile communication network 130 and a Public Switched Telephone Network (PSTN).

The VARS system 120 receives the information on whether the VARS application is downloaded to the terminal 100 and the type of the communication scheme supported by the terminal 100, both of which are provided by either a Home Location Register (HLR) of the mobile communication network 130 or a terminal information server connected to the mobile communication network 130, and provides them to the ARS system 120 in real-time or in a batch mode. Also, the VARS system 120 transmits, to the terminal, a screen image of an ARS menu within relevant content during a session of the terminal 100 trying data access using an IDentifier (ID) of a particular ARS system. Further, the VARS system 120 reconfigures a query in a required form in response to the query requesting detailed content for each item of the ARS menu, and transmits the reconfigured query to the ARS system 110. Subsequently, the VARS system 120 reconfigures, into a query for a screen layout, the query on the detailed content to which the ARS system 110 responds, and transmits the query for the screen layout to the terminal 100.

The term a "Type of a communication scheme supported by a terminal" among multiple pieces of terminal information provided by the VARS system 120 refers to a communication scheme (i.e. a second Generation (2G) terminal, a 3G terminal, 4G terminal, etc.) supported by the relevant terminal. For example, when a terminal requesting an ARS service is above the 3G terminal, the terminal can provide simultaneous voice/visual guidance and a video service. When a terminal requesting an ARS service is above the 4G terminal, the terminal can provide moving-picture guidance and a visual ARS service associated with an Internet home page. Although a specific form of a VARS service using the 4G terminal is not described in the present invention because the standardization of 4G is currently in progress, it goes without saying that the 4G terminal can provide a VARS service which can be supported by the 4G terminal by using the idea of the art in the present invention.

The mobile communication network 130 can support both network environments in IS95A/B, Code Division Multiple Access 2000 1x (CDMA2000 1x) and CDMA2000 1x-EVolution Data Optimized (CDMA2000 1x-EVDO), and a network environment above the 3G in order to provide services of the present invention.

Figure 2:
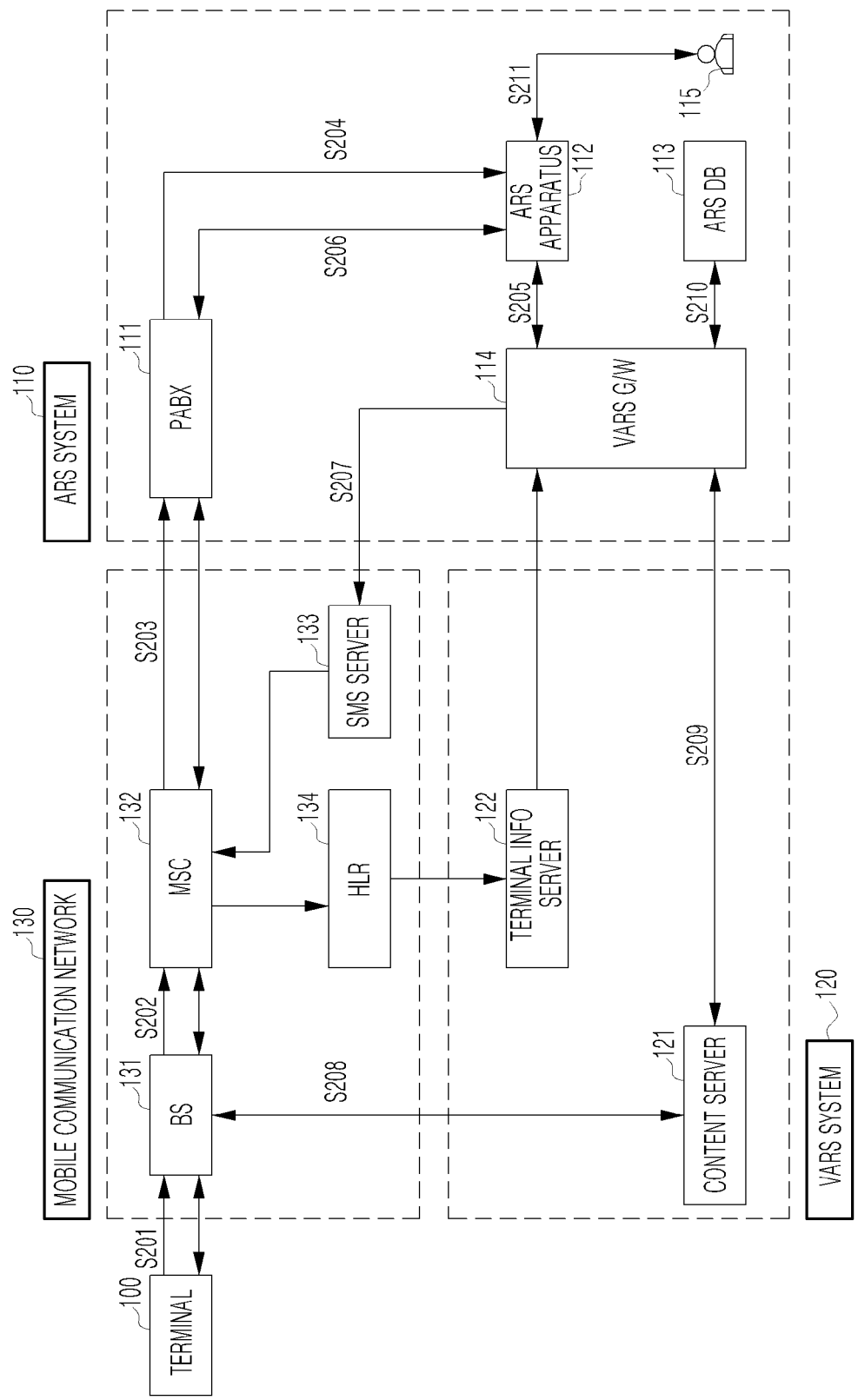
FIG. 2 is a block diagram illustrating operation processes between configuration blocks of the ARS service-providing system according to an embodiment of the present invention.

FIG. 2 is a block diagram illustrating operation processes between configuration blocks of the ARS service-providing system according to an embodiment of the present invention.

If the terminal 100 makes a call to a particular ARS system (S201), a Base Station (BS) 131 delivers a requested call to a Mobile Switching Center (MSC) 132 (S202). The BS 131 includes a Base Transceiver Station (BTS) and a Base Station Controller (BSC) in an environment for a mobile communication network in a synchronous CDMA. In an environment for a mobile communication network in a Wideband CDMA (W-CDMA), the BS 131 includes a Radio Transceiver Subsystem (RTS) and a Radio Network Controller (RNC). The BS 131 includes systems for supporting the 2G, 3G, 4G, and the like, corresponding to the evolution of a mobile communication network. The MSC 132 tries to connect to a Private Automatic Branch eXchange (PABX) 111 (S203), and the PABX 111 tries to connect to an ARS apparatus 112 (S204).

When the ARS apparatus 112 requests a VARS G/W 114 to provide information on checking if the VARS application is downloaded to the terminal 100 and a communication scheme of the terminal 100, the VARS G/W 114 requests a terminal information server 122 to provide the information as described above, receives the information provided by the terminal information server 122, and then delivers the received information to the ARS apparatus 112 (S205).

The ARS apparatus 112 determines a VARS service which can be provided based on the received information, and provides a voice announcement for providing the VARS service (S206). If the terminal 100 is not loaded with the VARS application, a user of the terminal 100 can use only a voice ARS service. When the terminal 100 is loaded with the VARS application and supports a 2G communication scheme, the ARS apparatus 112 provides the voice announcement that a user can use voice guidance or visual guidance, thereby enabling the user to select a voice ARS service or a VARS service. When the terminal 100 supports a communication scheme above the 3G, the ARS apparatus 112 provides the voice announcement that a user can use any of voice guidance, visual guidance, simultaneous voice/visual guidance, and visual guidance by a consultant, thereby enabling a user to select a desired one of them.

In order to provide screen images of both an ARS menu and detailed content for each item of the ARS menu, requested by the user's selection of either the visual guidance or the simultaneous voice/visual guidance, a content server 121 transmits query information requested by the terminal 100 to an ARS DataBase (ARS DB) 113 via the VARS G/W 114. The content server 121 receives requested information from the ARS DB 113, and provides the received information to the relevant originating terminal 100 via the content server 121 (from S208 to S210).

When a user of the originating terminal 100 desires to talk to a consultant 115 on the phone while using particular visual information provided by the content server 121, the terminal 100 originates a call to a telephone number of a consultant in charge of a relevant work included in a screen image of the particular content. Then, the ARS apparatus 112 assigns a received call to an available consultant 115 in step S211, thereby connecting a call path between the relevant terminal 100 and the relevant consultant 115.

Meanwhile, when the terminal 100 makes a call to the ARS system 110 via the mobile communication network 130, the ARS system 110 provides a voice announcement of an ARS service asking which type of guidance (i.e. either voice guidance, visual guidance, simultaneous voice/visual guidance, or visual guidance by a consultant) a user desires to receive. When the user receiving the voice announcement of the ARS service selects a particular type of guidance, each operation of the terminal 100 depending on the user's selection is as follows.

When the user of the terminal 100 listens to the voice announcement and selects voice guidance from among voice guidance, visual guidance, simultaneous voice/visual guidance, and visual guidance by a consultant, the ARS apparatus 112 provides a voice guidance service through an Interactive Voice Response (IVR) device within the ARS apparatus 112 in the same manner as the existing ARS service.

When the terminal 100 selects the visual guidance, the ARS apparatus 112 provides a visual guidance service to the VARS G/W 114. Then, the VARS G/W 114 generates an application execution SMS message including a call blocking command and content URL information, and transmits the generated application execution SMS message to the terminal 100 via an SMS server 133 (S207). Upon receiving the application execution SMS message, the terminal 100 executes a VARS application built-in thereto, blocks a call in progress, connects to a content server 121 or the particular WAP server 140 by using the content URL information included in the application execution SMS message, and displays required information on a screen thereof.

When the terminal 100 selects the simultaneous voice/visual guidance, the ARS apparatus 112 provides a service of the simultaneous voice/visual guidance to the VARS G/W 114. Then, the VARS G/W 114 generates an application execution SMS message including a call holding command and content URL information, and transmits the generated application execution SMS message to the terminal 100 via the SMS server 133. Upon receiving the application execution SMS message, the terminal 100 executes the VARS application built-in thereto, holds a call in progress, connects to the content server 121 or the particular WAP server 140 by using the content URL information included in the application execution SMS message, and displays required information on the screen thereof, while providing the voice guidance service through the IVR device in the same manner as when selecting the voice guidance.

When the terminal 100 selects the visual guidance by a consultant, the ARS apparatus 112 provides a service of the visual guidance by the consultant to the VARS G/W 114. Then, the VARS G/W 114 generates an application execution SMS message, including a video call transfer command, content URL information and a telephone number of a consultant capable of answering video telephony received from the ARS apparatus 112, and transmits the generated application execution SMS message to the terminal 100. Upon receiving the application execution SMS message, the terminal 100 executes the VARS application built-in thereto, originates a video call to the telephone number of the available consultant, connects to the content server 121 or the particular WAP server 140 by using the content URL information, and displays required information on a screen thereof.

When the user selects a particular type of guidance in response to a voice announcement provided by the ARS system 110, multiple pieces of information included in the application execution SMS message in order to support the selected type of the guidance are shown in Table 1 below.

TABLE 1

| Voice Announcement Announcement Type | Whether to transmit an SMS message or not | Call Processing Command | Content URL Information |
|---|---|---|---|
| Voice Guidance | not transmit | N/A | N/A |
| Visual Guidance | transmit | call blocking | provide |
| Simultaneous Voice/ Visual Guidance | transmit | call holding | provide |
| Visual Guidance by a Consultant | transmit | video call transfer | provide or not provide |

The application execution SMS message has fields as in FIG. 3 in order to include the multiple pieces of information as shown in Table 1.

In FIG. 3, a TeleService IDentifier (TID) 301 is an identifier used to discriminate a type of a relevant SMS message from other types of SMS messages. The TID indicates that an application execution SMS message according to an embodiment of the present invention is not a general character SMS message but an SMS message for executing application loaded into the terminal 100.

An application ID 302 is a field for recording an ID of a VARS application intended to be executed in order to provide a service of the present invention from among various applications loaded into the terminal 100.

A call control parameter 303 is a field for recording a command for call processing, including call holding, call blocking, video call transfer, and the like. The call control parameter 303 includes a command indicating how the VARS application should control a call in order to provide a service of the present invention so that the VARS application may either hold, block, or transfer, to a video call, a call in progress after the execution of the VARS application. For example, "HLD" represents call holding, "BLK" represents call blocking, and "VCL" represents video call transfer.

A content URL 304 is a field for recording content URL information with which the VARS application tries data access in order to provide content after the control of a call by using the call processing command. The content URL 304 includes a URL of a particular server for storing contents therein and a URL of an ARS menu screen.

Figure 4:
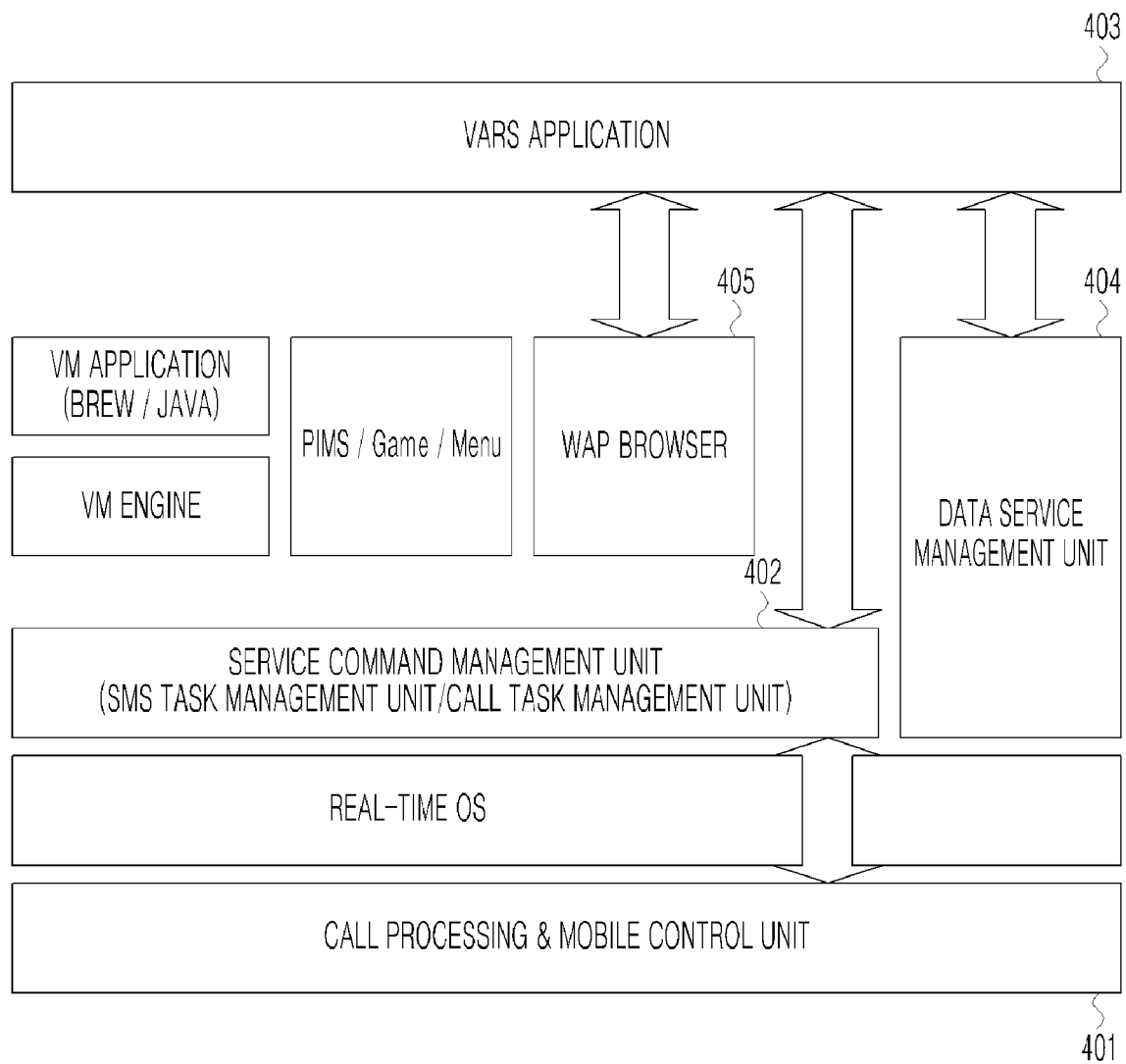
FIG. 4 is a block diagram illustrating a configuration of a terminal according to an embodiment of the present invention.

FIG. 4 is a block diagram illustrating a configuration of the terminal 100 according to an embodiment of the present invention. An intensive description will be of units taking charge of important functions in the terminal 100 in association with providing of a service of the present invention.

A service command management unit 402 includes an SMS task management unit and a call task management unit. When receiving an SMS processing request from a call processing and mobile control unit 401, the SMS task management unit analyzes a tag of a received SMS message, and checks if the received SMS message is an SMS message for executing a VARS application. When it is checked that the received SMS message is the SMS message for executing the VARS application, the SMS task management unit executes the VARS application 403. When the VARS application 403 is executed by the SMS task management unit, the call task management unit controls a screen related to a phone call so that a User Interface (UI) of the VARS application can be first applied to the terminal 100.

The VARS application 403 executed by the SMS task management unit requests the call task management unit to either hold, block, or transfer, to a video call, a call by using a call processing command included in the application execution SMS message. Then, by using the content URL information, the VARS application 403 drives a data service management unit 404 to connect to the content server 121, or drives a WAP browser 405 to connect to the particular WAP server 140. Subsequently, the VARS application 403 receives and analyzes information provided by either the content server 121 or the particular WAP server 140, and configures, in a defined form, screen images of both an ARS menu and detailed content for each item of the ARS menu.

Figure 5:
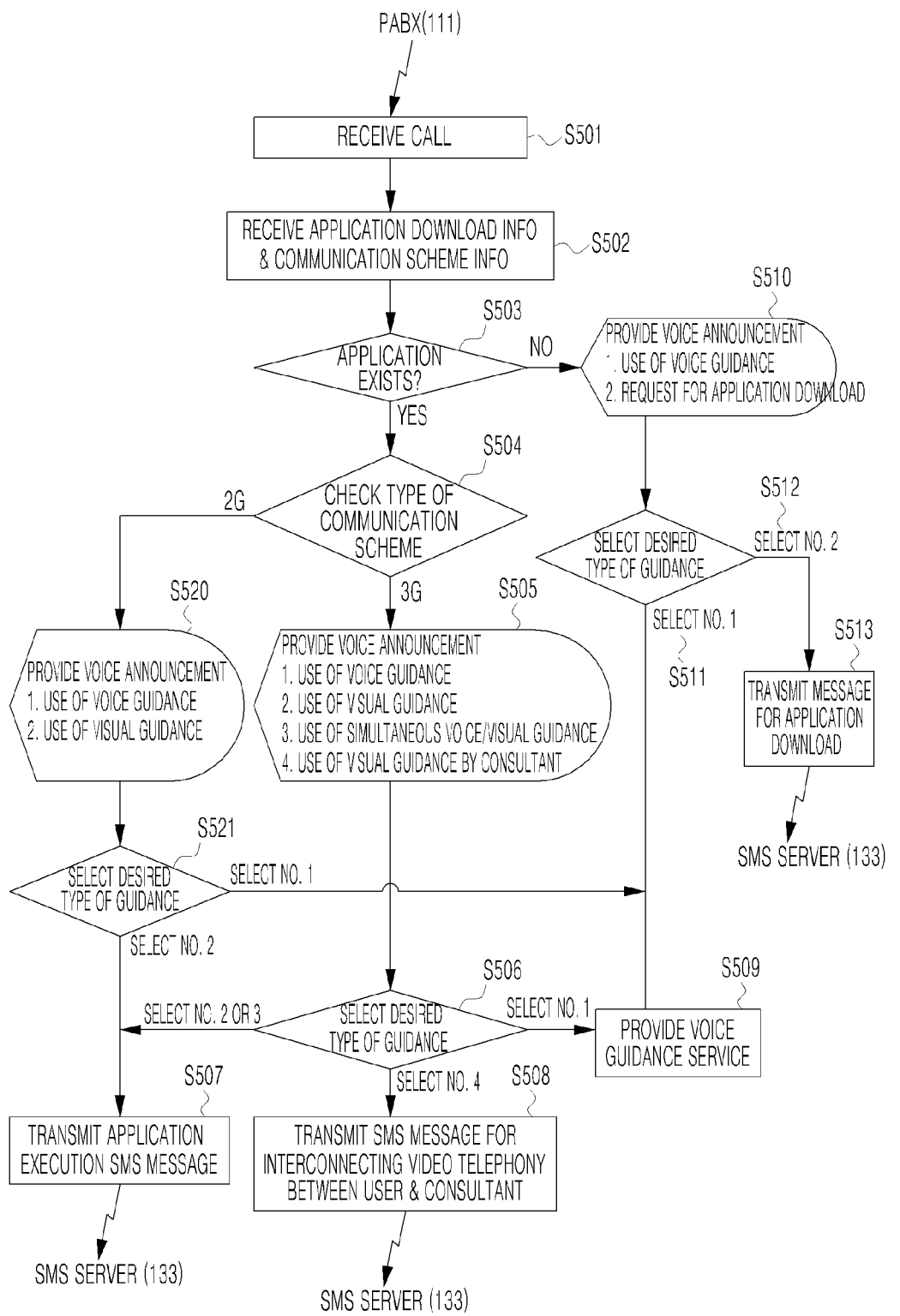
FIG. 5 is a flowchart showing an operation process of an ARS system according to an embodiment of the present invention.

FIG. 5 is a flowchart showing an operation process of the ARS system 110 according to an embodiment of the present invention.

When the ARS apparatus 112 receives a call from the PABX 111 (S501), the ARS apparatus 112 brings information on both VARS application download and a type of a communication scheme from the terminal information server 122 (S502). The ARS apparatus 112 determines in step S503 if there is a VARS application in the terminal 100 based on the brought information. When the ARS apparatus 112 determines in step S503 that there is the VARS application in the terminal 100, it additionally checks the type of the communication scheme (S504). When the terminal 100 supports the 3G, the ARS apparatus 112 provides, in step S505, a voice announcement recommending the selection of any of services of simultaneous voice/visual guidance (i.e. a voice/visual ARS service) and visual guidance by a consultant (i.e. video telephony with a consultant), in addition to services of basic voice guidance (i.e. a voice ARS service) and basic visual guidance (i.e. a visual ARS service). In step 506, a user of the terminal 100 selects a particular type of guidance through the terminal 100 in response to the voice announcement provided in step S505.

When the user of the terminal 100 selects the visual guidance (i.e. No. 2) or the simultaneous voice/visual guidance (i.e. No. 3), the VARS G/W 114 delivers an application execution SMS message for providing the visual ARS service to the relevant terminal 100 in response to a request of the ARS apparatus 112 (S507). When the user selects the visual guidance by a consultant (i.e. No. 4), the VARS G/W 114 delivers an application execution SMS message for providing the service of the visual guidance by the consultant and the visual ARS service to the relevant terminal 100 in response to a request of the ARS apparatus 112 (S508). On the other hand, when the user selects the use of the voice guidance (i.e. the voice ARS service corresponding to No. 1), the relevant voice guidance service is only performed in step 509 by a device, such as an IVR device, etc., within the ARS apparatus 112 without the transmission of an application execution SMS message.

Meanwhile, when it is determined in step S504 that the terminal 100 does not support the 3G based on information on a type of a communication scheme of the terminal 100, the ARS apparatus 112 provides, in step S520, a voice announcement recommending the selection of either the basic voice guidance service (i.e. the voice ARS service) or the basic visual guidance service (i.e. the visual ARS service). In step 521, the user selects a particular type of guidance through the terminal 100 in response to the voice announcement provided in step S520.

When the user of the terminal 100 listens to the voice announcement in step S520 and selects the visual guidance (i.e. No. 2), the VARS G/W 114 delivers an application execution SMS message for providing the visual ARS service to the relevant terminal 100 in response to a request of the ARS apparatus 112 (S507). When the user selects the use of the voice guidance (i.e. the voice ARS service corresponding to No. 1), the relevant voice guidance service is only performed in step 509 by a device, such as an IVR device, etc., within the ARS apparatus 112 without the transmission of an application execution SMS message.

Meanwhile, when the ARS apparatus 112 determines in step S503 that there is no VARS application in the relevant terminal 100 based on the information on the VARS application download, it provides, in step S510, a voice announcement asking if the user of the terminal 100 uses the voice guidance (i.e. the voice ARS service) or requests the download of the VARS application to the terminal 100. When the user selects, in step S511, the use of the voice guidance (i.e. the voice ARS service corresponding to No. 1), the relevant voice guidance service is performed as in step 509. On the other hand, when the user selects, in step S512, the request for downloading the VARS application to the terminal 100 (i.e. No. 2), the VARS G/W 114 delivers, to the relevant terminal 100, a URL callback SMS message for downloading the VARS application to the terminal 100 (S513).

FIG. 6 is a flowchart showing an operation process of the content server 121 according to an embodiment of the present invention.

With respect to the terminal 100 trying to connect to the content server 121 by using an ID of a particular ARS system, the content server 121 analyzes the ID of the particular ARS system (S601), generates a query based on information requested by the terminal 100 (S602), and then requests the VARS G/W 114 to provide data on the requested information (S603). Upon receiving the data on the requested information from the ARS DB 113, the VARS G/W 114 provides the received data to the content server 121. Then, the content server 121 receives the data (S604), generates a query for screen display of the terminal 100 (S605), and then transmits the generated query to the relevant originating terminal 100 (S606).

Also, the content server 121 may include its own DB therein, may keep configuration information of an screen image of an ARS menu provided during a request of the VARS service in its own DB according to an ID of an ARS system, and may provide the configuration information to the terminal 100 in response to a request of the terminal 100.

FIG. 7 is an explanatory view showing each operation of the VARS G/W 114 according to an embodiment of the present invention.

Each time the ARS apparatus 112 sends a request, the VARS G/W 114 operates as follows. When the ARS apparatus 112 sends a request for information on both whether the download of a VARS application is loaded into the terminal 100 and a type of a communication scheme of the terminal 100, the VARS G/W 114 inquires of the terminal information server 122 about the information, and transmits the information to the ARS apparatus 112 (S701). When the ARS apparatus 112 sends a request for transmitting an application execution SMS message for a particular VARS service, the VARS G/W 114 generates an application execution SMS massage including both a call control command and content URL information, required to provide the particular VARS service, and requests the SMS server 133 to transmit the generated application execution SMS massage (S702). In the same manner, when the ARS apparatus 112 sends a request for transmitting a URL callback SMS message for application download, the VARS G/W 114 requests the SMS server 133 to transmit the URL callback SMS message for the application download (S703).

Also, the VARS G/W 114 performs functions of requesting and transmitting content between the content server 121 and the ARS DB 113 (S704). Namely, in order to provide screen images of both an ARS menu and detailed content for each item of the ARS menu, required to provide a VARS service, the VARS G/W 114 receives query information requested by the terminal 100 from the content server 121, delivers the received query information to the ARS DB 113, and requests the ARS DB 113 to provide the screen images of both the ARS menu and the detailed content for each item of the ARS menu. Then, the VARS G/W 114 receives the requested information from the ARS DB 113, and delivers the received information to the content server 121.

FIG. 8 is a flowchart showing an operation process of the terminal 100 according to an embodiment of the present invention.

When trying to make an ARS phone call, the user of the terminal 100 receives, from the ARS system 110, a voice announcement of an ARS service asking which type of guidance (i.e. either voice guidance, visual guidance, simultaneous voice/visual guidance, or visual guidance by a consultant) the user desires to receive. When the user listens to the voice announcement of the ARS service and selects voice guidance from among voice guidance, visual guidance, simultaneous voice/visual guidance, and visual guidance by a consultant, the user receives a voice guidance service through the IVR device within the ARS apparatus 112 in the same manner as the existing ARS service.

On the other hand, when the user selects a VARS service, such as the visual guidance, the simultaneous voice/visual guidance, and the visual guidance by a consultant, the terminal 100 receives an application execution SMS message, and performs call control and content access by using the received application execution SMS message. An operation of the terminal 100 related to the reception of an SMS message as described above will be described in detail with reference to FIG. 8.

Upon receiving an SMS message, the terminal 100 checks a type of the received SMS message (S802). The type of the SMS message can be checked based on a TID included in the SMS message as illustrated in FIG. 3. If it is checked in step S802 that the received SMS message is a general character SMS message, processing of a general character SMS message is performed (S803).

If it is checked in step S802 that the received SMS message is an application execution SMS message, the terminal 100 checks an application ID, and executes a relevant VARS application (S804).

After the VARS application is executed as described above, the VARS application checks a call control command recorded in a call control parameter 303 of the application execution SMS message as illustrated in FIG. 3 (S805). When information of the call control parameter is a call holding command, the VARS application holds a voice call connection as it stands (S806). When information of the call control parameter is a call blocking command, the VARS application sends a request to the call task management unit within the terminal 100, and then the call task management unit blocks a voice call connection (S807). Also, when information of the call control parameter is a video call connection, the VARS application tries a video call connection to a telephone number of a consultant capable of answering video telephony, and interconnects video telephony between the user of the terminal 100 and the consultant (S808).

After performing call control by using the call control command as described above, the terminal 100 checks a field 304 named "Content URL" of the application execution SMS message as illustrated in FIG. 3, and determines if content URL information is included in the content URL 304 (S809). If it is determined in S809 that the content URL information is included in the content URL 304, the terminal 100 connects to the content server 121 or the WAP server 140 by using the relevant URL information (S810), and downloads content.

In an embodiment of the present invention, when the user selects the visual guidance, the terminal 100 receiving the application execution SMS message executes a VARS application, and then blocks a call in progress by using a call control command included in the application execution SMS message in order to provide a VARS service. Meanwhile, as another embodiment of the present invention, the VARS G/W 114 may deliver the application execution SMS message to the terminal 100, and then send a request to the ARS apparatus 112 so that the ARS apparatus 112 can directly block a call. As a result, the user can receive the visual guidance service through the terminal 100.

FIG. 9 is an illustrative view showing an ARS service-providing UI according to an embodiment of the present invention.

When the terminal 100 makes a call to a particular ARS system (S901), the ARS apparatus 112 checks both whether the relevant terminal 100 is loaded with the VARS application and a type of a communication supported by the terminal 100. Then, the ARS apparatus 112 sends a voice announcement recommending ARS services which can be supported by the ARS apparatus 112 (S902). When the user selects visual guidance (i.e. No. 2) in response to the voice guidance, the VARS G/W 114 provides the terminal 100 with an application execution SMS message including both a call blocking command and URL information on a VARS service menu, required to provide the VARS service, according to the directions of the ARS apparatus 112. Then, the VARS application within the terminal 100 is executed so that it may block a call. Subsequently, the terminal 100 connects to the content server 121, and displays the ARS menu on a screen thereof (S903). When searching for the ARS menu on the screen to select a particular type of guidance which he/she desires to use, the user of the terminal 100 receives a screen image of detailed content of the selected type of the guidance from the content server 121 (S904). If the user desires to talk to a consultant on the phone while using a screen image of particular detailed content, the user selects a send key on the screen (S905). At this time, the VARS application originates a call to a consultant in charge of the detailed content mapped to the send key (S906). If the call is connected to the consultant, the user talks to the consultant on the phone (S907). When the user blocks a phone call, the user returns to a screen image for selecting the send key (S908).

INDUSTRIAL APPLICABILITY

Although several exemplary embodiments of the present invention have been described for illustrative purposes, those skilled in the art will appreciate that various modifications, additions and substitutions are possible, without departing from the scope and spirit of the invention as disclosed in the accompanying claims. Therefore, it is obvious that the scope of the present invention is not determined by the exemplary embodiments as described above, and extends to not only the scope of the appended claims but also the scope of equivalents.

What is claimed is:

1. A system for providing an Automatic Response System (ARS) service, the system comprising:
    an ARS system for providing a voice announcement of an ARS service asking about a desired ARS service type when receiving a request for the ARS service from a terminal, and transmitting, to the terminal, an application execution message for executing a Visual ARS (VARS) application in the terminal when receiving a request for a VARS service from the terminal;
    a VARS system for providing the ARS system with terminal information of the terminal, and providing the terminal with screen images of both an ARS menu and a detailed content for each item of the ARS menu in response to the request for the VARS service by the terminal; and
    the terminal for executing the VARS application in the terminal, connecting to the VARS system by using content location information included in the application execution message, and receiving and displaying the screen images of both the ARS menu and the detailed content for each item of the ARS menu, when receiving the application execution message from the ARS system,
    wherein the ARS system provides the terminal with a voice announcement recommending the VARS service only if the VARS application for performing the VARS service within the terminal is loaded into the terminal.

2. The system as claimed in claim 1, wherein the terminal information comprises both a type of a communication scheme supported by the terminal and whether the VARS application is downloaded to the terminal.

3. The system as claimed in claim 1, wherein the ARS system downloads the VARS application to the terminal when the VARS application is not installed on the terminal which requests the ARS service.

4. The system as claimed in claim 1, wherein the ARS system performs a voice ARS service for the terminal when the ARS system provides the voice announcement of the ARS service and then receives a request for voice guidance from the terminal.

5. The system as claimed in claim 1, wherein a determination of the call control is not made by the terminal, but is performed by the ARS system by determining call processing details required to support a particular VARS service selected by a user.

6. The system as claimed in claim 1, wherein the VARS system comprises:

a terminal information server for transmitting the terminal information of the terminal requesting the ARS service to the ARS system; and a content server for configuring screen images of both an ARS menu and a detailed content for each item of the ARS menu, and providing the configured screen images of both the ARS menu and the detailed content for each item of the ARS menu to the terminal connecting to the content server by using the URL information included in the application execution SMS message.

7. The system as claimed in claim 6, wherein the content server receives information requested by the terminal from an ARS DataBase (ARS DB) within the ARS system, and provides the received information to the terminal.

8. The system as claimed in claim 6, wherein the ARS system comprises:

a VARS GateWay (VARS G/W) for performing a gateway function between the VARS system and an SMS server;

an ARS apparatus for receiving information on whether the VARS application is loaded into the terminal, providing the terminal with a voice announcement of an ARS service for selecting a voice ARS service or a supportable VARS service, and directing the VARS G/W to deliver the application execution message; and an ARS DB for storing therein contents required to provide the VARS service.

9. The system as claimed in claim 8, wherein, when receiving a request for the terminal information of the terminal from the ARS apparatus, the VARS G/W requests the VARS system to transmit the terminal information, receives the requested terminal information, and delivers the received terminal information to the ARS apparatus.

10. The system as claimed in claim 8, wherein, when receiving a request for transmitting the application execution message from the ARS apparatus, the VARS G/W generates an application execution message including both a call control command and content URL information required to provide the VARS service, and requests the SMS server to transmit the generated application execution message.

11. The system as claimed in claim 8, wherein, when receiving a request for transmitting a URL callback message for application download from the ARS apparatus, the VARS G/W generates the URL callback message for the application download including location information of a particular application download server, to which an application is downloaded, and requests the SMS server to transmit the generated URL callback message for the application download.

12. The system as claimed in claim 8, wherein the VARS G/W performs a request for a content and the delivery of the requested content between the content server and the ARS DB.

13. A method for providing an Automatic Response System (ARS) service, the method comprising the steps of:

1) providing a voice announcement of the ARS service asking if a terminal is to receive a voice ARS service or a Visual ARS (VARS) service when receiving a request for the ARS service from the terminal, by an ARS system;

2) performing a voice guidance ARS service when receiving a request for the voice ARS service from the terminal, and transmitting, to the terminal, an application execution message for executing a VARS application built-in to the terminal when receiving a request for the VARS service from the terminal, by the ARS system; and 3) executing the VARS application to display a screen image of an ARS menu when receiving the application execution message from the ARS system, by the terminal, wherein step 1) comprises sub-steps of:

1-1) receiving a call for requesting the ARS service from the terminal;

1-2) receiving terminal information of the terminal, and determining both whether the VARS application is loaded into the terminal and a type of a communication scheme supported by the terminal; and 1-3) providing a voice announcement of the ARS service asking if the terminal is to receive the voice ARS service or an available VARS service when it is determined in step 1-2) that the VARS application is loaded into the terminal.

14. The method as claimed in claim 13, wherein the voice announcement of the ARS service corresponds to a voice announcement requesting selection of voice guide or visual guidance.

15. The method as claimed in claim 14, wherein the voice announcement of the ARS service further comprises a voice announcement recommending simultaneous voice/visual guidance and a voice announcement recommending visual guidance by a consultant when the type of the communication scheme supported by the terminal is above a third Generation (3G).

16. The method as claimed in claim 13, wherein an ARS apparatus of the ARS system blocks a call connection process in progress after directing the transmission of the application execution message.

* * * * *